United States Patent
Babu et al.

(10) Patent No.: US 10,807,430 B2
(45) Date of Patent: Oct. 20, 2020

(54) AXLE/SUSPENSION SYSTEMS

(71) Applicant: HENDRICKSON UNITED KINGDOM LTD, Wellingborough (GB)

(72) Inventors: Sathya Babu, Wellingborough (GB); Nathan Wilson, Wellingborough (GB); Gerhard Seck, Waiblingen (DE)

(73) Assignee: Hendrickson United Kingdom Ltd (GB)

( * ) Notice: Subject to any disclaimer, the term of this patent is extended or adjusted under 35 U.S.C. 154(b) by 57 days.

(21) Appl. No.: 15/778,130

(22) PCT Filed: Dec. 9, 2016

(86) PCT No.: PCT/EP2016/080384
§ 371 (c)(1),
(2) Date: May 22, 2018

(87) PCT Pub. No.: WO2017/097957
PCT Pub. Date: Jun. 15, 2017

(65) Prior Publication Data
US 2018/0354330 A1     Dec. 13, 2018

(30) Foreign Application Priority Data
Dec. 11, 2015 (GB) .................................. 1521841.5

(51) Int. Cl.
*B60G 9/02*     (2006.01)
*B60G 9/00*     (2006.01)
(Continued)

(52) U.S. Cl.
CPC ................ *B60G 9/02* (2013.01); *B60B 35/04* (2013.01); *B60G 7/02* (2013.01); *B60G 9/003* (2013.01);
(Continued)

(58) Field of Classification Search
CPC . B60G 7/02; B60G 9/02; B60G 11/27; B60G 9/003; B60G 2204/45;
(Continued)

(56) References Cited

U.S. PATENT DOCUMENTS 2,958,526 A    11/1960   Ulderup et al.
3,147,964 A    9/1964   Wolf
(Continued)

FOREIGN PATENT DOCUMENTS

DE            2912533 A1    11/1979
DE    102015016142 A1 *   6/2017  ............ F16F 1/3842
(Continued)

*Primary Examiner* — Paul N Dickson
*Assistant Examiner* — Joselynn Y Sliteris
(74) *Attorney, Agent, or Firm* — Dureska & Moore, LLC; David P. Dureska; David J. Danko

(57) ABSTRACT

An axle/suspension system (1) has an axle (5) supported from the frame of the vehicle by a pair of rigid longitudinal beams (4) pivoted to frame hangers (3). Air springs (7) and shock absorbers (8) connect between the rigid beams (4) and the frame above to control suspension movement. The axle/suspension system is particularly suited as a mid-lift axle on the tractor of a tractor-trailer vehicle. A characteristic feature is the pivotal connection (21) between each hanger (3) and beam (4), which is through a resilient bush (6) having a compliance ratio—being a ratio of the longitudinal spring rate to the vertical spring rate—of at least 10:1.

22 Claims, 8 Drawing Sheets

(51) Int. Cl.
  *B60G 7/02* (2006.01)
  *F16F 1/387* (2006.01)
  *F16F 1/38* (2006.01)
  *B60B 35/04* (2006.01)
  *B60G 11/27* (2006.01)

(52) U.S. Cl.
  CPC ............... *B60G 11/27* (2013.01); *F16F 1/38* (2013.01); *F16F 1/387* (2013.01); *F16F 1/3828* (2013.01); *F16F 1/3842* (2013.01); *B60G 2200/31* (2013.01); *B60G 2200/326* (2013.01); *B60G 2202/152* (2013.01); *B60G 2204/143* (2013.01); *B60G 2204/148* (2013.01); *B60G 2204/4104* (2013.01); *B60G 2204/4302* (2013.01); *B60G 2204/45* (2013.01); *B60G 2204/47* (2013.01); *B60G 2300/026* (2013.01); *B60G 2300/402* (2013.01)

(58) Field of Classification Search
  CPC ........ B60G 2200/326; B60G 2202/152; B60G 2204/148; B60G 2204/47; B60G 2200/31; B60G 2204/143; B60G 2204/4104; B60G 2204/4302; B60G 2300/026; B60G 2300/402; F16F 1/387; F16F 1/38; F16F 1/3828; F16F 1/3842; B60B 35/04
  See application file for complete search history.

(56) References Cited

U.S. PATENT DOCUMENTS

| | | |
|---|---|---|
| 3,508,745 A | 4/1970 | Deane |
| 3,881,711 A | 5/1975 | Lemaitre |
| 4,157,227 A | 6/1979 | Hahle |
| 4,166,640 A | 9/1979 | Van Denberg |
| 4,732,407 A | 3/1988 | Oyama et al. |
| 4,893,798 A | 1/1990 | Hibi et al. |
| 4,991,868 A | 2/1991 | VanDenberg |
| 5,190,269 A | 3/1993 | Ikeda et al. |
| 5,531,426 A | 7/1996 | Bruhl |
| 5,690,353 A * | 11/1997 | Vandenberg ........... B60G 7/001 280/124.116 |
| 5,769,380 A | 6/1998 | Hibi et al. |
| 5,996,981 A | 12/1999 | Dilling |
| 6,585,223 B1 | 7/2003 | VanDenberg |
| 7,207,583 B2 | 4/2007 | Ross et al. |
| 2002/0130480 A1 | 9/2002 | VanDenberg |
| 2003/0111818 A1 | 6/2003 | Carlstedt et al. |

FOREIGN PATENT DOCUMENTS

| | | | |
|---|---|---|---|
| DE | 102015016454 A1 * | 6/2017 | ............ F16F 1/3873 |
| DE | 102015016454 B4 * | 2/2018 | |
| DE | 102015016142 B4 * | 5/2018 | |
| EP | 1674757 A1 | 6/2006 | |
| EP | 1998068 A2 | 12/2008 | |
| GB | 2071265 A | 9/1981 | |
| WO | 1997035123 | 9/1997 | |
| WO | 2012044802 A1 | 4/2012 | |

* cited by examiner

AXLE/SUSPENSION SYSTEMS

CROSS-REFERENCE TO RELATED APPLICATIONS

This application claims the benefit of PCT Application Serial No. PCT/EP2016/080384 filed Dec. 9, 2016, and Great Britain Patent Application Serial No. 1521841.5 filed Dec. 11, 2015.

FIELD OF THE INVENTION

This invention relates to vehicle axle/suspension systems and suspension assemblies, and in particular to such systems and assemblies for heavy-duty vehicles such as trucks and tractor-trailers (semi-trailers, articulated lorries). Application of the invention is envisaged particularly to non-driven axles, more particularly to lift axles which may or may not carry steerable wheels. One specific implementation envisaged for the invention is for a lift axle of a truck or tractor unit (as distinct from a trailer) which also has a separate steering axle and/or driven axle. However the invention may be applied over a wide range of axle types: driven and non-driven, steerable and non-steerable, lift or non-lift.

BACKGROUND

Trailing arm and leading arm axle/suspension systems are widespread in the heavy-duty truck and tractor-trailer industry and have superseded leaf spring suspensions in many areas. Trailing and leading arms in the form of rigid beams are used in conjunction with discrete springs—usually air springs ("air-ride" suspension)—acting between the beam or axle and the vehicle frame. One end of the beam connects to the frame through a pivotal connection, usually via a fixed frame hanger depending from the frame and a resilient bush at the pivot. The other end of the beam is fixed to the axle typically by clamping, welding, bolting or some combination thereof, depending on the structure of the beam and axle. An air spring can be mounted on an air spring seat or mount which is on the beam or axle. In the case of a non-driven (dead) axle a lift mechanism may be provided to raise the axle when not needed for load bearing, reducing tyre wear and improving steering and handling. The axle/suspension system may comprise or carry a brake system for braking wheels on the axle.

With simply-pivoted rigid beams fixed rigidly to a rigid axle, stability and traction are compromised when cornering and on uneven surfaces. This is acceptable for a trailer, but not for steered units where independent vertical compliance for the axle ends is needed for safety and handling. These systems usually therefore use a flexible leaf or spring beam instead of a rigid beam. Or, it is known to use a set of upper and lower control links in which a series of flexibly-bushed pivots provides the necessary degree of independent flexion but these systems are complex and bulky.

A recent example of a non-driven tractor axle (a mid-lift axle) is shown in FIGS. 1 and 2 which correspond to disclosure in WO2012/044802. Since the present invention is useful for a mid-lift axle assembly, this prior art is now described. FIG. 1 is a front perspective view showing the axle/suspension system with lift mechanism, air springs and shock absorbers. FIG. 2 is a partial bottom perspective view omitting the lift mechanism, air spring and shock absorber and showing the connection between the spring beam and the axle. The mid-lift axle/suspension system 310 is of a well-established general type, to be installed ahead of the drive axle of a tractor. It includes a transverse rigid non-driven axle 332 and a mirror-image pair of suspension assemblies 314, each having a hanger 316 to be bolted to the respective longitudinal frame member and a trailing longitudinal spring beam 318 with a front end 320 pivoted to the hanger 316 and a rear end 326 fixed to the axle 332 at an axle/spring connection 305.

The front end 320 of each spring 318 has an eye holding a pivot bush 322 with a conventional straddle-mount centre pin extending through a rubber cylinder and received in a mounting hole of the hanger 316 (shown broken away in FIG. 1).

The rear end 326 of the spring beam 318 is fixed to the axle 332 by a spring seat 372 having upper and lower seat portions 370,371, and a connector sleeve 331 joined to the spring seat 372 by U-bolts 376 and welds 375. The top spring seat part 370 also provides lower mountings 384,380 for a shock absorber 382 and an air spring 324, the top ends of which are fixed to the chassis frame above.

The axle 332 has a straight tubular body extending between the spring beam 318 and at each end a raised extension or gooseneck carrying the axle spindle. At each side an air-actuated lift mechanism 381 is mounted to the frame through the hanger 316 and operates to raise the axle via a lift arm 379 projecting from it. There may also be a brake system carried on the axle and/or beam and spring seat assemblies: the torque plate 307 of such a brake system is shown.

FIG. 2 also shows features of an axle/beam connection newly proposed in WO2012/044802 whereby instead of bolting or welding directly to the axle body 332, a metal connector sleeve 331 is fitted around the axle 332 and a circumferential series of depressions 306 is formed in both sleeve and axle simultaneously, by a crimping or swaging process, forming a strong and rigid interlock connection.

This arrangement functions well; the spring beams 318 provide the compliance necessary for good handling and traction in a mid-lift axle and the crimped connections reduce weight.

Axle/suspension systems are always subject to a desire to reduce weight while maintaining effectiveness, because commercial vehicles' value depends on load-carrying ability. Increasing recent requirements for safety and emission control systems also add weight, detracting further from load-carrying ability and putting a further premium on weight saving in the body, frame and suspension of the heavy-duty vehicle.

THE INVENTION

The inventors have perceived that a suspension with a rigid beam fixed to a rigid axle could have better performance, even including satisfactory performance for handling and steering demands, if a special type of coupling is provided between the beam and its mounting to the frame. This proposal would firstly provide a useful alternative construction, and secondly open the way to weight reduction because rigid beams can be made with a relatively lightweight fabricated structure.

The invention provides an axle/suspension system for a heavy-duty vehicle, having a vehicle frame with a longitudinal axis corresponding to a driving direction of the vehicle, the system comprising a vehicle axle extending transversely and having first and second ends;

a suspension assembly at each end of the axle to support the axle, each suspension assembly comprising a frame mount such as a frame hanger fixedly attached to, or for fixed attachment to, a vehicle frame;

a rigid longitudinal suspension beam connected fixedly to the axle at an axle/beam connection structure and pivotably to the frame mount through a resilient bush, so as to connect the axle to the frame mount;

the resilient bush having a ratio of longitudinal stiffness (spring rate) to vertical stiffness (spring rate) of at least 10:1, desirably at least 15:1, especially at least 20:1, preferably at least 25:1 and more preferably at least 30:1. Usually the ratio is not more than 75:1.

The resilient bush will generally have a structure with an inner mount unit connected to or comprised in one of the beam and frame mount, an outer mount connected to or comprised in the other of the beam and frame mount and an elastic spring infill portion, typically comprising one or more elastomer elements, extending between the inner mount unit and outer mounts and providing for resilient movement between them in all radial directions relative to the bush axis, including direction components of the longitudinal direction along the length of the rigid beam between the pivot and axle, and the vertical direction—perpendicular to the longitudinal direction—corresponding to movement of the beam pivot up and down relative to the vehicle frame. Of course the vertical direction might not be exactly vertical, depending on the geometry and instantaneous position of the suspension, and can alternatively be defined as the radial direction perpendicular to the direction of maximum radial stiffness of the bush. Thus, the bush in the system may be described in terms of its directions of maximum and minimum stiffness or spring rate (minimum and maximum compliance) which are perpendicular to one another and to the axis of the bush and may exhibit the stiffness/spring rate ratios specified above, or alternatively with reference to horizontal and vertical directions in the axle/suspension system, or with reference to the longitudinal direction of the beam and the direction perpendicular to it.

Preferably an inner mount unit of the bush is fixed to the frame mount and an outer mount to the beam. The beam may have an opening receiving the bush, engaging the outer mount thereof which is usually a shell or casing around the elastic infill portion although in some cases an elastomer element may directly engage the surrounding mount/beam opening. The inner mount unit may comprise an axially-projecting pin for straddle mounting, an open tube for bolting through, or any other suitable mount form.

The skilled person will appreciate that such a high stiffness ratio is unprecedented in a suspension bush for a heavy-duty vehicle. However such a bush can readily be produced using known techniques and principles of bush manufacture, e.g. in line with specific proposals given below.

Desirably the limit of vertical relative movement (vertical compliance or travel) available at the resilient bush axis is at least 15 mm, preferably at least 20 mm. Desirably such a range of vertical relative movement is available both above and below a rest, static or centre position i.e. at least ±12 mm, preferably at least ±15 mm, more preferably at least ±20 mm. The compliance and displacement range in one vertical direction are not necessarily identical to those in the other, for example depending on static vertical load at the bush, but often this static vertical load is small or negligible and causes little or no relative vertical displacement.

The longitudinal (substantially horizontal, maximum stiffness) displacement or compliance available is desirably not more than ±10 mm, preferably not more than ±7 mm, more preferably not more than ±5 mm, to maintain positional stability of the axle as in conventional systems.

Typically the longitudinal/horizontal/maximum stiffness rate is at least 30,000 N/mm, more preferably at least 40,000 N/mm. Usually it is not more than 60,000 N/mm, more preferably not more than 50,000 N/mm. Typically the vertical/minimum stiffness rate is not more than 2,000 N/mm, more preferably not more than 1,500 N/mm. Usually the vertical/minimum stiffness rate is at least 500 N/mm, more preferably at least 700 N/mm.

The skilled person will understand that this very high ratio of longitudinal to vertical stiffness in the resilient connection at the pivot enables sufficient vertical compliance to enable suspension articulation when driving around corners and over uneven surfaces so that steering and handling can be satisfactory and need not be adversely affected despite the use of rigid beams.

The rigid beam is preferably of a fabricated construction, that is to say at least the body of the beam being formed or assembled from one or more sheet-form or plate-form metal elements rather than cast or forged as a solid body, although the latter is an option. This enables significant weight and cost reduction, including weight reduction relative to spring beams (which must be thick and heavy to provide sufficient bending strength to carry vehicle weight). The beam or at least the main body thereof desirably has opposed spaced side walls, such as an open channel or box section. Spaced side walls in sheet form can be formed with recesses or through-holes corresponding to and receiving an exterior of the axle. A rigid axle/beam connection may then be made securely by engagement of the beam wall edges with the axle, or with layer-form or sleeve-form axle connector elements such as a connector sleeve fitting around the axle, obviating heavy solid clamp assemblies. Such a connector sleeve may be connected to the axle by means of complementary indentations of the sleeve and axle, desirably inward, desirably plural, desirably in an array distributed circumferentially around the sleeve and axle. Preferably these indentations are formed simultaneously in sleeve and axle with the sleeve fitted around the axle e.g. as described in WO2012/044802. Desirably the axle/beam connection does not comprise any weld onto the axle. The mentioned sleeve or other layer-form connector may be connected to the beam by welding, e.g. around a conforming recess formed in the beam such as in one or more side walls or vertical walls thereof.

Other forms of rigid axle/beam connection structure may be used, however, including known connection structures using any of seats, clamps, bolts and the like.

The axle may be a hollow tubular or fabricated axle, at least at an axle body portion to which the beams connect. The ends of the axle may have supplementary formations bearing axle spindles. The axle ends may have gooseneck or other offset formations whereby the axes of the axle spindles are above an axis of the axle body.

The axle may carry a brake system for the wheels thereof.

Preferably the system is an air-ride suspension system, comprising at least one air spring connecting between the beams and/or axle below and the vehicle frame above. There may be a respective air spring at each side of the system, desirably with a lower air spring mount on the respective beam. Such an air spring mount may be fabricated on the upper side of the beam above, adjacent or behind the axle/beam connection.

The axle/suspension system may be a lift axle system, comprising lift mechanism for lifting the axle relative to the vehicle frame with upward pivoting of the beams. There may be respective subsidiary lift mechanisms at the two sides of the system. The or each lift mechanism may comprise an actuator element—usually operable by extension, such as a pneumatic or hydraulic element or a pre-compressed spring—acting between a fixed mounting e.g. fixed onto or relative to the frame through a hanger providing the frame mounting of the beam, and a driven abutment fixed to the axle or beam at a distal position thereof, i.e. spaced from the pivot e.g. adjacent the axle.

One or more shock absorbers (dampers) may be included in the suspension system, such as in each suspension assembly, a lower shock absorber support may be provided on top of the beam. An upper shock absorber support may be separately provided to the vehicle frame above, or integrated into a frame mounting element such as a hanger which also carries the pivot connection for the beam.

The axle is usually a non-steering axle, but the invention is also applicable to steered axles.

Preferred constructions for the resilient bush at the pivotal mounting of the beam to the frame mount are now discussed. As is well known, a compliance ratio between higher longitudinal and lower vertical spring rates can be provided by means of upper and lower voids in an elastomer infill structure of the bush between the inner and outer mounts. Such voids are preferred in the resilient bush used herein. Thus, the bush may comprise front and rear elastic elements extending solidly between the inner and outer mounts to provide the longitudinal stiffness, with voids above and below whereby the vertical stiffness arises primarily from vertical shear of the front and rear elements.

Our WO1998/009094 disclosed trailer suspension beam bushes with upper and lower voids providing a vertical rate less than the longitudinal rate over a short displacement range; in practice the stiffness rate ratio in commercial embodiments of these proposals has been about 2.5.

At high compliance/stiffness ratios and especially such as those proposed herein it is generally desirable to avoid excessive strain in the compliant or elastic elements. Any of a range of means may be used for this, including in particular means known in the art of bushings. One suitable means is by interleaving one or more rigid elements, e.g. metal elements, into the elastomer portions providing resilient compliance. This divides the elastomer into a radially-extending series of two or more sub-elements, controlling movement so that strain is distributed among the sub-elements and local tearing avoided. Such provision of metal interleaving is known in the art. In the present proposal preferably each of front and rear elastomeric elements has two or more metal interleaves. As is known these interleaves are desirably plate forms, usually bonded intimately to the elastomer e.g. as a result of curing/vulcanisation in contact. They may have an inwardly-concave or outwardly-convex form to complement the axial geometry of the bush.

Desirably the inner mount unit is or comprises a solid body, such as a metal body, with outwardly-convex front and rear faces, e.g. outwardly angled sub-faces, to promote uniform compression of the front and rear elastomer elements. Again, this is a feature known in itself. The front/rear face shape of the inner mount unit may conform to the shape of metal interleaves as discussed above.

The upper and lower voids may extend substantially or entirely to the outer mount and/or substantially or entirely to the inner mount unit, to maximise the space for low-resilience (high-compliance) relative movement in the vertical direction. Preferably however resilient bumpers are provided, on upper and lower faces of the inner mount unit and/or on top and bottom inward faces of the outer mount, to avoid damage if these mounts are relatively displaced to their vertical limit. Such bumpers may be of elastomer e.g. as present elsewhere in the bush, or of other plastics material. Elastomer parts of the bush may be formed separately from one another or formed together, such as integrated into a one-piece whole, e.g. formed in a single process of curing or vulcanising in contact with the metal bush elements as is well known in the art. Desirably, the inner and outer bush mount components can move through at least 50%, more preferably at least 60% or at least 70% of their maximum vertical relative movement before any abutting contact e.g. at a bumper as mentioned above. Further displacement after such contact may be by compressing one or more bumpers. There may be an increase, e.g. a progressive increase, in spring rate for further displacement beyond the contact.

In addition to providing vertical compliance, the beam bushes—as with known beam bushes e.g. in trailer suspensions—need to accommodate movement corresponding to pivoting of the beam, usually with resilient torsion in the bush. Such movement can be accommodated where front and rear elastomer elements are separated by substantial upper and lower voids, as described above. Or, additional means may be provided to accommodate torsional movement with or without resilience. According to one preferred embodiment in the present proposals, this is achieved by providing an internal bush in the inner mount unit. Thus, this unit may comprise an outer piece or block with an internal cavity extending in the axial direction of the bush and containing an elastomer element—such as a cylindrical elastomer element which may be without voids—and a rigid central mounting part such as a tube or pin extending through this elastomer element. The internal bush provides for torsional deformation of the inner elastomeric element when there is relative rotation of the central mounting part and the surrounding piece of the inner mounting unit, thereby uncoupling part of the torsional spring performance from the circumferentially highly discontinuous spring elements providing the overall characteristic for displacements transverse to the axis.

Thus one suitable form of bushing used in the invention comprises an outer mount, an inner mount unit positioned within the outer mount at a spacing, front and rear elastomeric elements connecting between the outer mount and inner mount unit at front and rear positions, defining top and bottom voids substantially separating the front and rear elastomer elements, top and bottom protection bumpers facing onto the top and bottom voids to prevent direct rigid contact between the inner mount unit and outer mount at maximum vertical relative displacement, and metal interleaf elements dividing the front and rear elastomer elements to limit local strain therein;

the inner mount unit defining an inner cavity containing an elastomer element and a rigid central mounting part (at which the bush is fixed to the relevant external component such as the frame mount of the suspension) inside the elastomer element.

This pivot bush can be highly directional in characteristics. It is therefore preferred to provide one or more circumferentially-localised abutment formations on the outer mount to engage mechanically with corresponding circumferentially-localised abutment formations on the suspension assembly component to which it is fixed—in the beam or frame mount, usually the beam—to hold the bush at a predetermined rotational alignment relative to that component. An alternative is to make the bush non-circular and fit in a correspondingly non-circular recess or mounting of the component, to prevent the bush from turning out of alignment.

Generally the elastomer elements of bushes require substantial radial pre-compression to avoid any tension in operation. In the present proposals this may be achieved, as is well known, by providing the casing or shell (outer mount) of the free (initially formed, uncompressed) bush as two or more separate spaced parts which are pushed together e.g. to form a continuous tubular form when the bush is compressed to its operational condition. Thus, the above preferred form of the bush with front and rear or other elastomer elements may have separate e.g. front and rear casing (outer mount) parts attached to these. Since the requirement for substantial vertical compliance means that the present bushes may be substantial in size, a further preferred proposal herein is to provide interlock formations of these outer mount or casing parts which overlap or interlock circumferentially in the installed position/condition of the bush. One casing part may have a projection or series of projections extending into a corresponding recess or series of recesses of another casing part. This inhibits the parts of the bush from moving axially relative to one another, for example inhibiting possible "walking" of the bush out of its mounting.

A preferred mounting for the bush is a metal tube, preferably comprised in or fixed at the pivot end of the rigid beam, preferably fixed by welding.

BRIEF DESCRIPTION OF THE DRAWINGS

Embodiments of the present proposals are now described by way of example with reference to the accompanying drawings in which.

DETAILED DESCRIPTION

Figure 1:
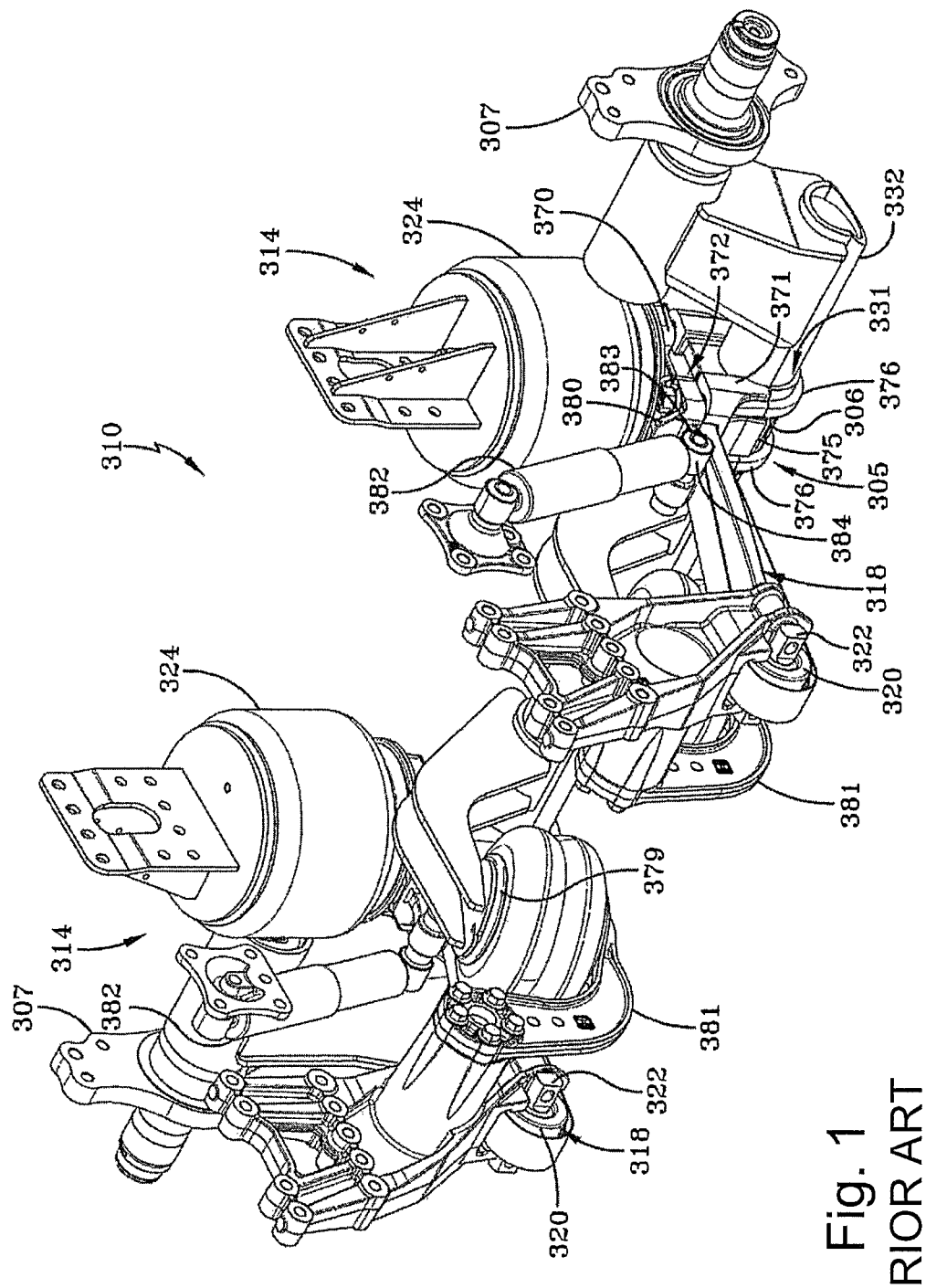
FIGS. 1 and 2 show a prior art construction and have already been described.
Figure 2:
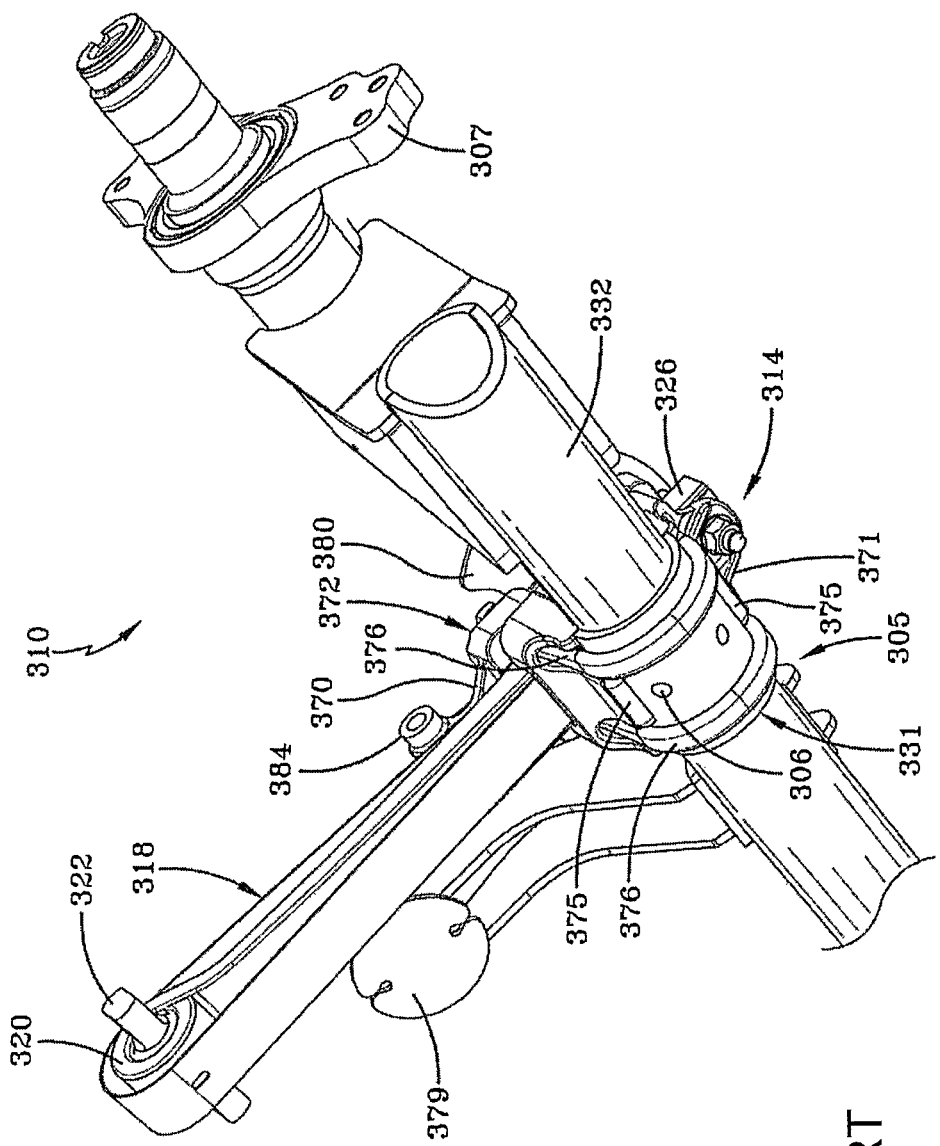
Figure 3:
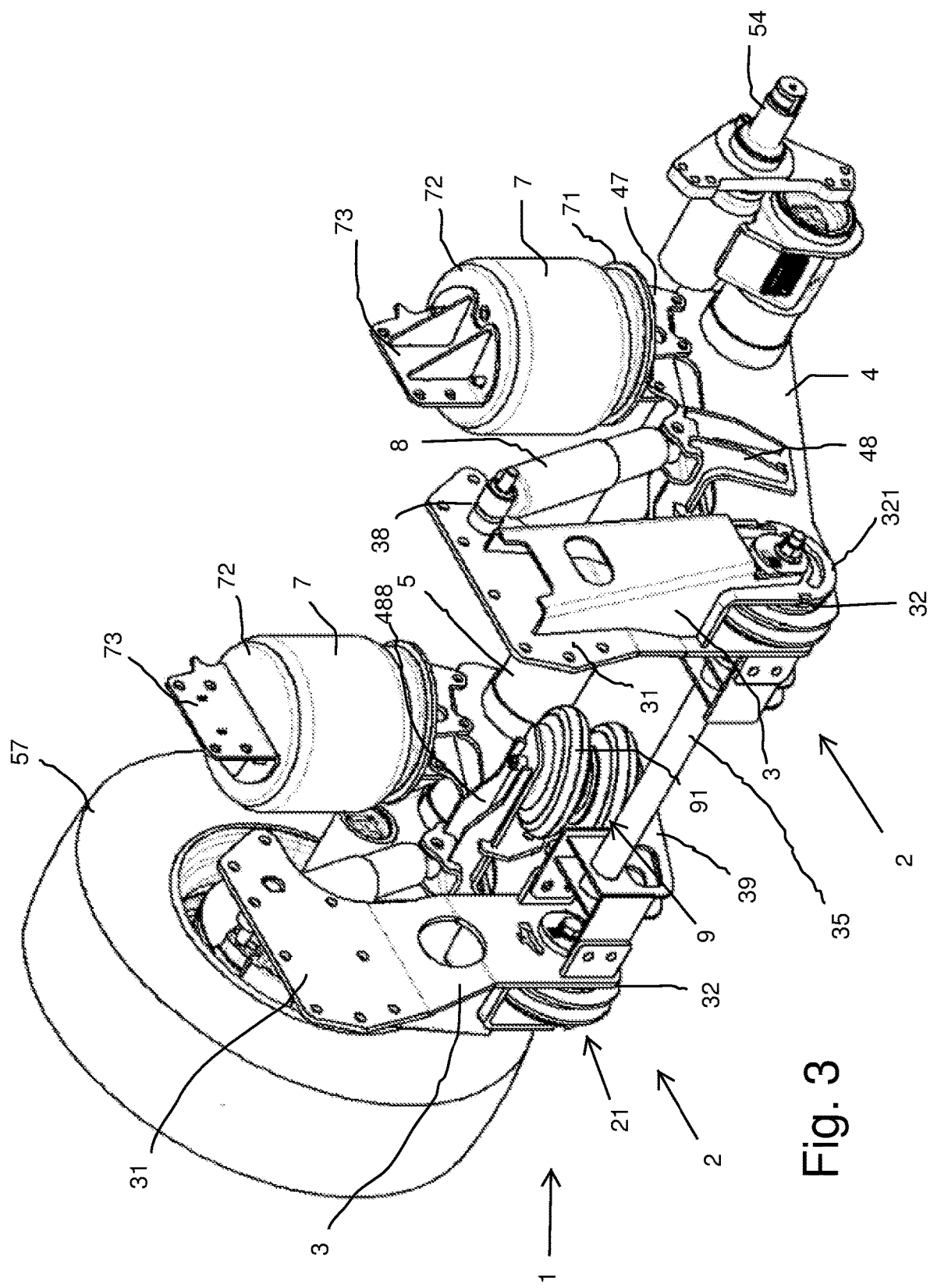
FIG. 3 is a perspective view from the front showing a trailing arm axle/suspension system embodying the invention.
Figure 4:
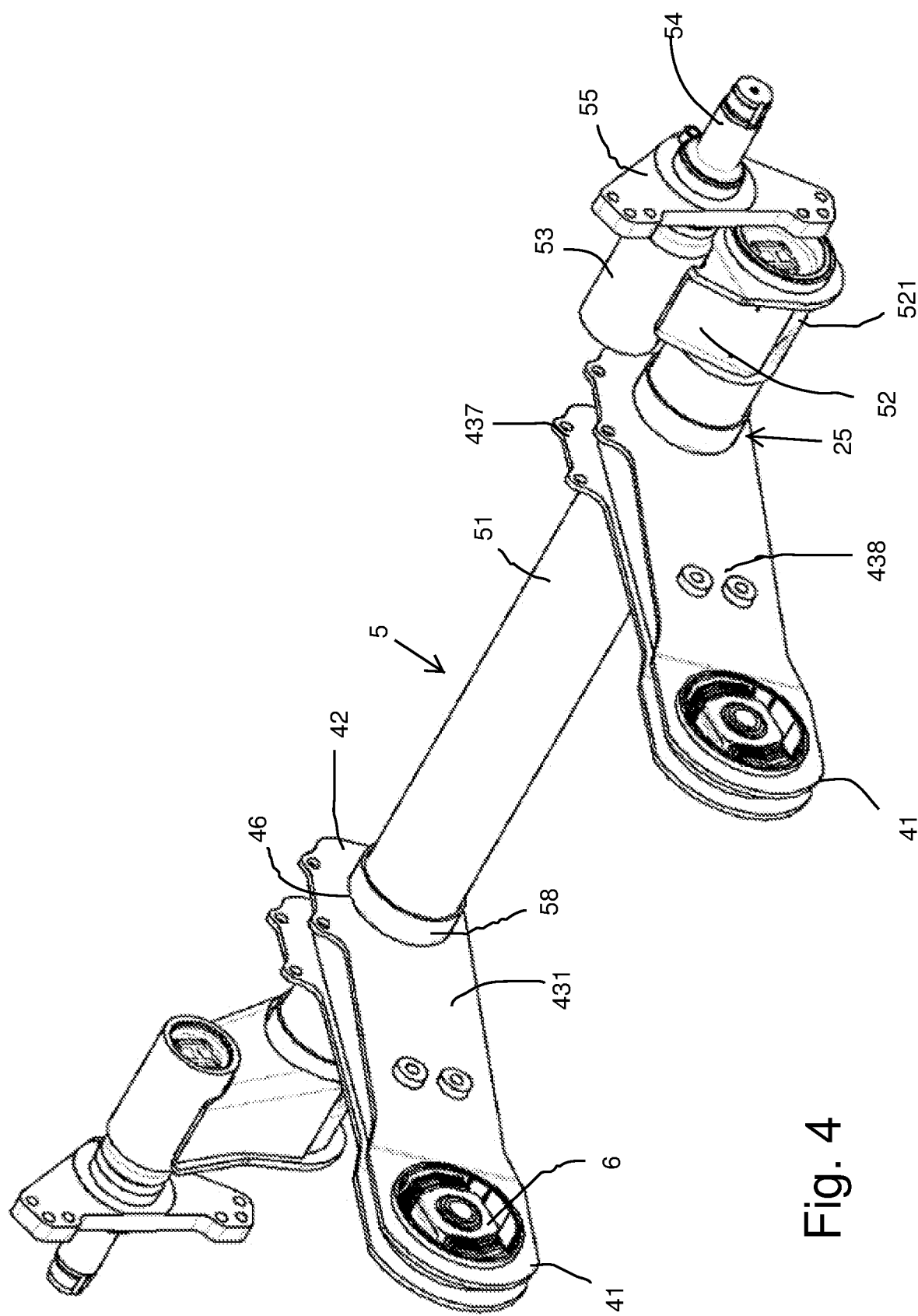
FIG. 4 is a corresponding view showing the axle and beams of the system.
Figure 5:
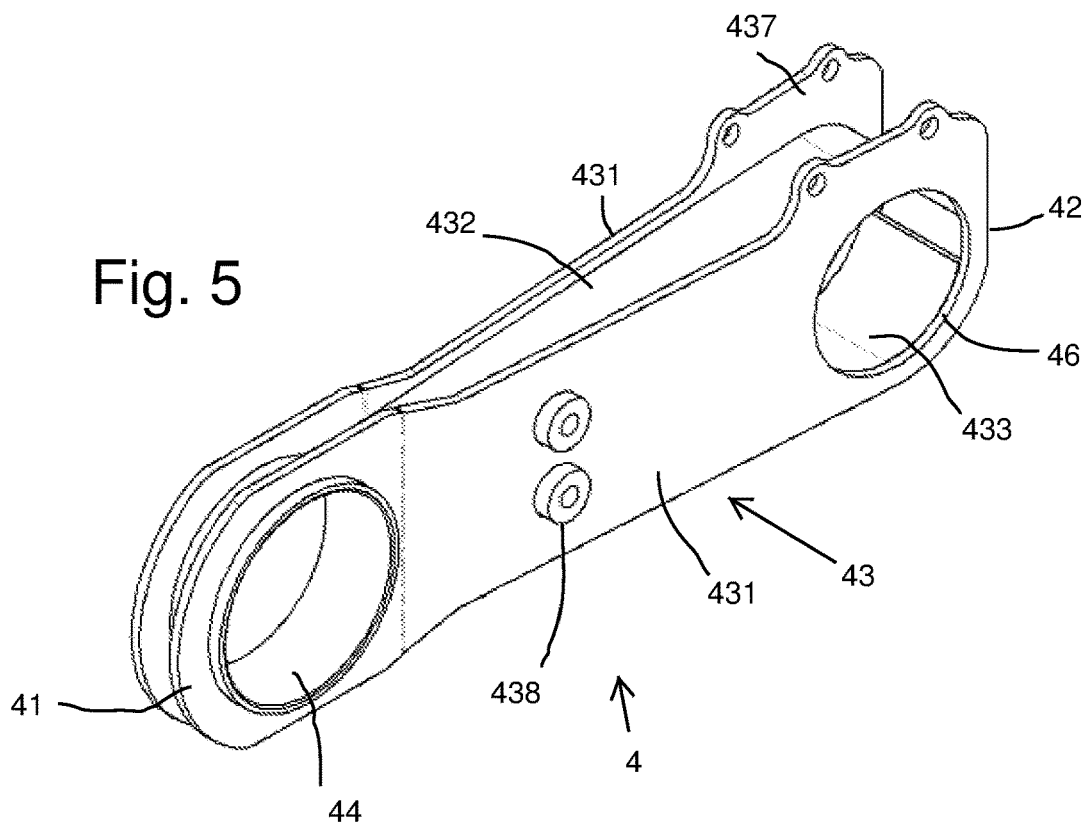
FIG. 5 is a perspective view showing details of a beam.

With reference to FIGS. 3 to 5, the axle/suspension system 1 for a mid-lift axle on the tractor of a tractor-trailer vehicle comprises an axle 5 and a suspension assembly 2 at each end of the axle 5 by which the axle is supported relative to longitudinal frame members (not shown, may be conventional) extending along each side of the vehicle. Each suspension assembly 2 includes a rigid beam 4—a trailing beam, in this example, although it can be a leading beam in other embodiments—connected at its front end 41 through a pivotal connection 21 to the bottom end of a frame hanger 3 fixed to the respective frame member. The beam 4 is fixed to the axle 5 at its rear end 42.

The hanger 3 depends from a fixing plate 31 bolted to the frame in a generally known manner, and provides at its bottom end a pivot mounting 32 with a pair of spaced cheek flanges 321.

The beam 4—see especially FIGS. 4 and 5—is a rigid fabricated construction made from steel plate, having a box section with opposed side plates 431, a top plate 432 and a bottom plate. A cylindrical bush mounting tube 44 is fixed at the front end (pivot end) 41 of the beam by welding into circular holes at the ends of the side plates 431, with its axis horizontal. At its rear (axle end) 42 of the beam the side plates 431 have circular openings 46 receiving a body tube of the axle and fixed to it as described later.

The axle 5 is a fabricated hollow construction having a main cylindrical body tube 51, a gooseneck or crank portion 52 attached at each end carrying a spindle mounting tube 53 in which a spindle 54 for a wheel 57 is fixed. In a mid-lift axle such a gooseneck or drop provides clearance e.g. for transmission components. In other axles e.g. tag axles this may not be needed and the axle can be straight. In this embodiment the axle/suspension system 1 also incorporates brake systems for the wheels 57: details may be as known and FIG. 4 shows a torque plate 55 of this; other types of brakes may be used. Another feature of this embodiment and generally preferred herein is that the crank or drop portion 52 comprises a sleeve 521 fitting around the end of the axle and fixed to it by means of a set of complementary inward indentations of the sleeve and axle distributed circumferentially around the sleeve and axle. These indentations are formed simultaneously in sleeve and axle with the sleeve fitted around the axle e.g. as described in WO2012/044802. Desirably this axle/crank connection does not comprise any weld onto the axle.

Figure 12:
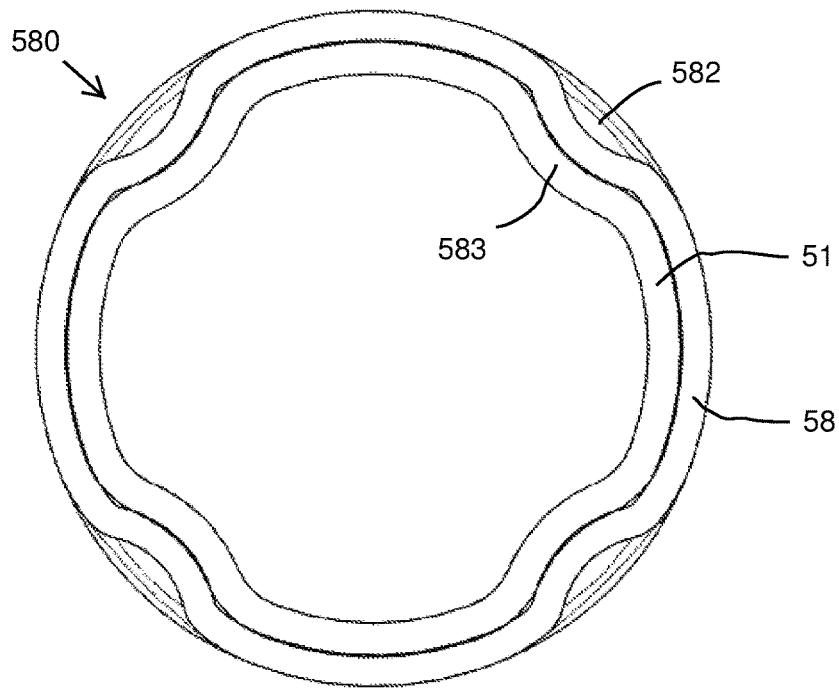
FIG. 12 is a cross-section of the axle showing part of an axle/beam connection.
Figure 13:
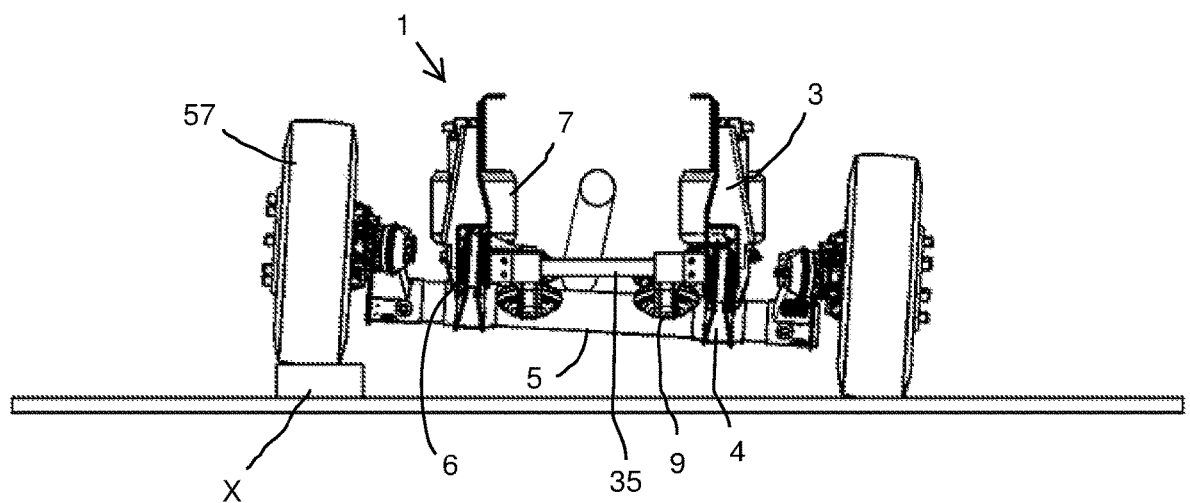
FIG. 13 is a front view of the axle/suspension system showing articulation and compliance of the system over an uneven surface.

In line with the proposals of WO2012/044802 referred to above, the axle/beam connection 25 is formed without any direct weld or bolting to the axle tube 51. As shown in FIGS. 4 and 12, a metal connector sleeve 58 fits closely around the axle tube 51 at the region to be connected, and a crimped joint 580 is created by forming a series of circumferentially-spaced indentations 582,583 around these tubes, by a compressive mechanical crimping or swaging device which indents them simultaneously, as shown in FIG. 12. The plastic deformation of the connecting sleeve indentations 582 is more than that of the axle tube indentations 583 within, so that they are then pressed together giving high strength and rigidity. The outside surface of the connecting sleeve 58 is then welded around the circular axle holes 46 in the beam to fix the axle rigidly to the beam. Because the axle tube 51 is not heat-affected by direct welding it does not suffer strength reduction and a lighter-section axle tube 51 can be used than in normal welded connections; this can reduce overall weight.

The low axis of the axle body tube 51 relative to the wheel spindles 54 in the present construction provides additional clearance for structures below the vehicle, especially for lifting the axle.

At the rear end 42 of the beam, air spring mounting points 437 with suitable fastener openings are provided along the top of each beam side plate 431. A fabricated air spring mounting platform 47 (FIG. 3) is mounted on these and supports the bottom plate 71 of an air spring 7, whose top plate 72 connects to a top mounting bracket 73 for fixing to the vehicle frame member above. The nature and role of such air springs is well-known and need not be explained further. The positions of the air springs relative to the axle and beams may vary in line with the technical context and skilled knowledge, for example the air spring may be mounted behind (beyond) the axle on an extension of or from the beam end.

Each beam 4 can be regarded as having a beam body 43 extending between the pivot end and axle end securing formations described above and having the mentioned box section. In this embodiment, the mid-part of the beam body 43 provides a mounting point 438, again with suitable fastener openings, for a discrete fabricated mount component 48 which provides a lower mounting for a shock absorber (damper) 8 whose upper end is mounted to an upper mounting 38 provided as part of the hanger 3, although it may alternatively be fixed directly to the vehicle frame. The fabricated mount component 48 on the beam also has an integral inward arm 488 constituting an upper reaction point for an axle lift mechanism 9. The lift mechanism 9 comprises an extensible lift actuator 91, such as a pneumatic actuator, operable to push up on the arm 488 of component 48 above relative to a fixed lift mounting abutment 39 below which projects from the bottom of the hanger 3. Controlled extension of the lift actuators 91 on either side of the suspension lifts the axle 5 towards the frame, with pivoting at the hanger-beam connections 21, lifting the wheels 57 out of road contact as is well known. A support cross-strut 35 connects rigidly between the bottom ends of the two hangers 3 to stabilise the structure. This strut operates to react directly lateral loads arising during vehicle turning and reduce torsional loads into the vehicle frame above.

The described construction relies largely on fabricated components, made from stock plate and tube elements by forming and joining and which can be light in weight.

Figure 6:
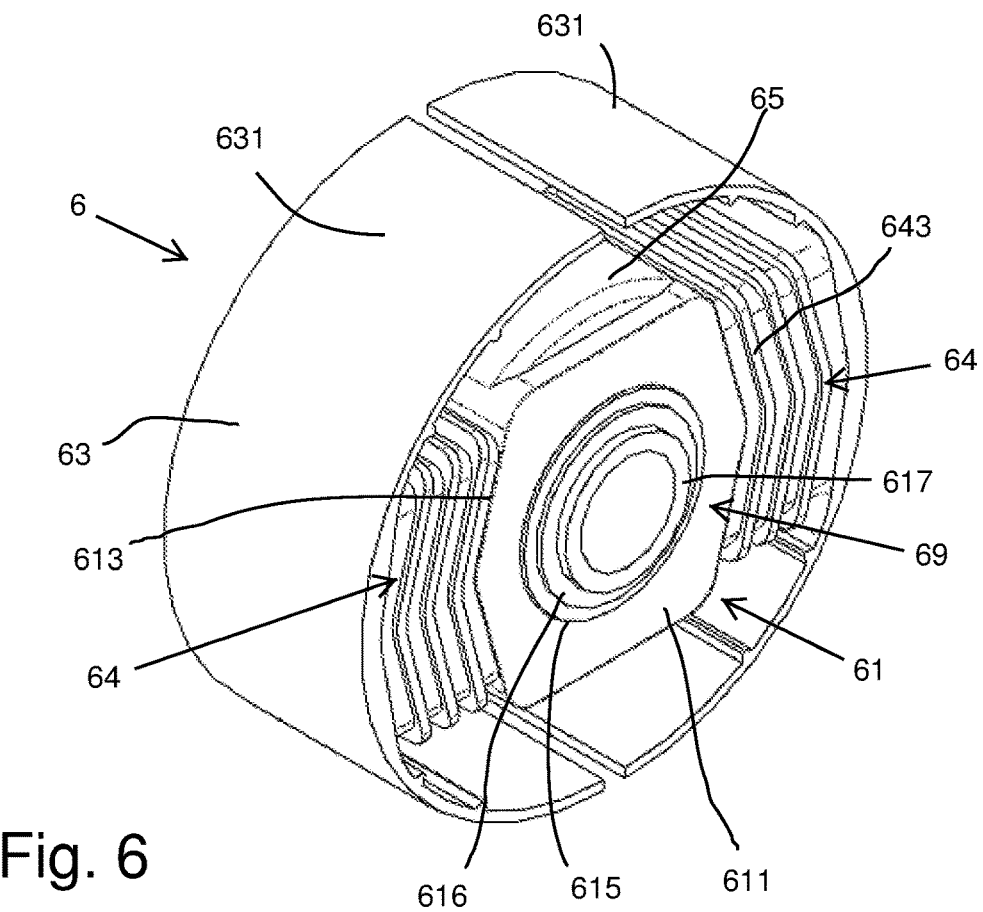
FIG. 6 is a perspective view of a first embodiment of a bush for the system.
Figure 10:
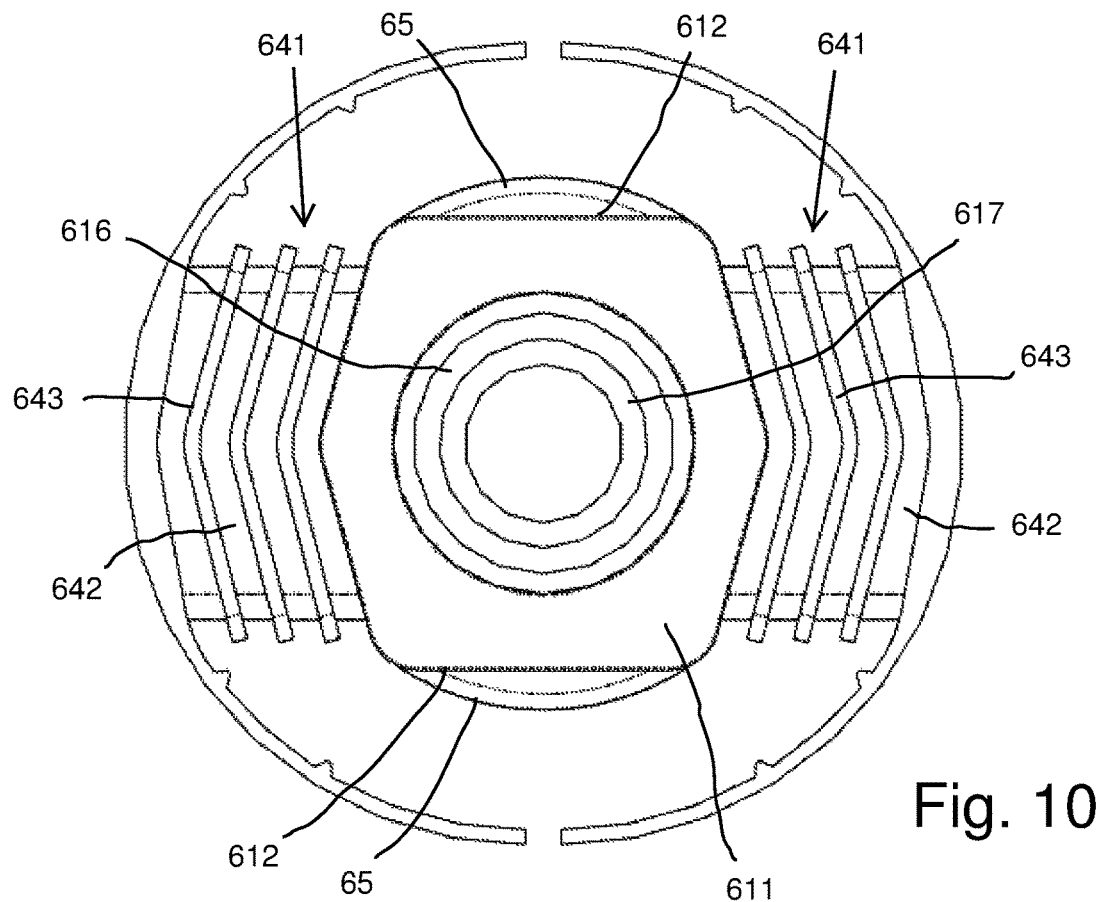
FIG. 10 is a face (axial) view of the first embodiment bush at its rest position.

Next, the characteristic pivotal connection 21 between each hanger 3 and beam 4 is described. A bush 6—shown generally in FIG. 4, in more detail in FIG. 6, and schematically in operation in FIGS. 10 and 11—is fixed in the bush mounting tube 44 at the front end of each beam 4. The special function of the bush 6 is to provide substantial independent vertical compliance at either side of the suspension system 1 so that the rigidity of the axle/beam assembly 4,5 does not disrupt the steering and handling of the tractor when cornering or passing over uneven ground. To this end the bush 6 provides an unusually large and soft vertical compliance, combined with the conventionally restricted longitudinal compliance necessary for stability and handling.

The main functional elements of the bushing 6 are an outer mount in the form of a cylindrical casing or shell 63, an inner mount unit 61 in the form of a generally prismatic metal block or piece 611 extending axially within the outer shell 63, and an elastomer infill 64 supporting the inner mount unit 61 coaxially with the outer shell 63. The outer shell 63 may be of steel. The elastomer elements of the infill may be formed and bonded by moulding and curing onto the metal elements, in a known manner which need not be described here.

Figures 11A, 11B:
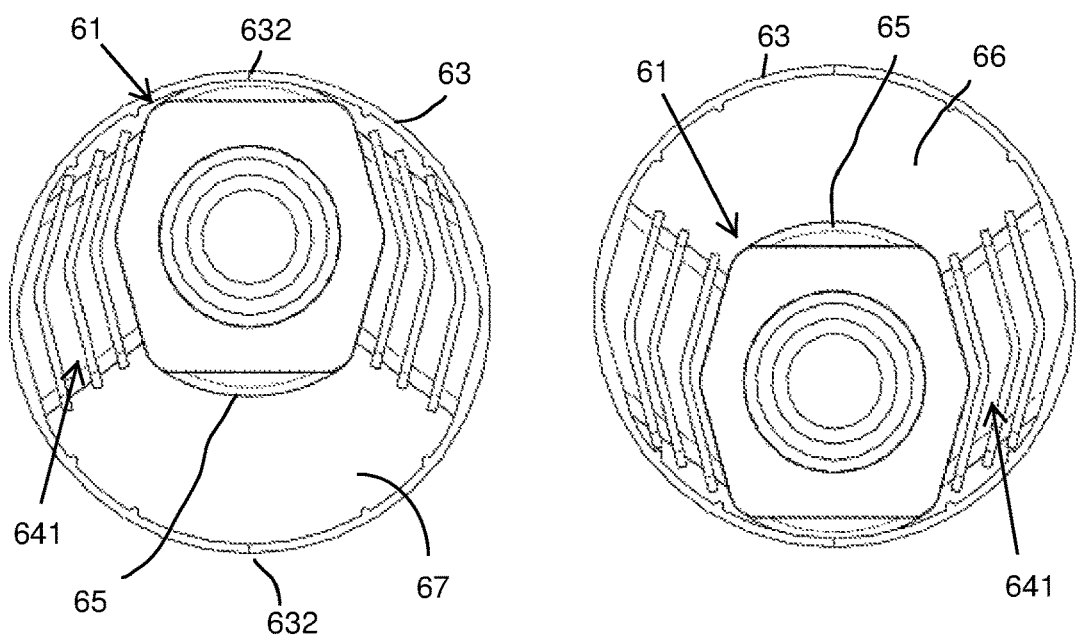
FIGS. 11(a) and 11(b) show positions of the FIG. 10 bush corresponding to the lowest and highest positions of the beam end.

The bushing provides for an unusually large vertical displacement, e.g. about ±25 mm, and may be typically from 130 to 180 mm in diameter. The combination of low vertical stiffness with high longitudinal stiffness is achieved by front and rear elastomer elements 641 essentially confined to the regions in front of and behind the block 611 of the inner mount unit, with substantial upper and lower voids 66,67 defined between the inner mount unit 61 and the top and bottom regions of the outer shells 63. Only a small elastomer bumper piece 65 on each of the top and bottom faces 612 of the inner mount block 611 separates them. FIGS. 11(*a*), (*b*) shows the vertical displacement modes of the bush 6 showing how the front and rear elements 641, which need provide only a conventional limited longitudinal displacement (e.g. about ±3 to 4 mm) which would not require large radial dimensions, must nevertheless be large in radial extent to be able to shear sufficiently to allow for the large vertical displacement. According to known principles, to distribute and limit the strain in these elements a set of metal interleaves 643 is provided to separate each element into elastomer sub-layers 642. Thus, when the bush reaches the limits of vertical displacement as shown in FIGS. 11(*a*) and (*b*) the strain in each elastomer layer 642 is limited and controlled by the division into sub-layers and the adhesion to the metal interleaves 643, enabling the large shear deformations shown without damage.

The metal block 611 of the inner mount unit 61 has convex side faces 613—provided in this embodiment as an angled pair of flat faces—for efficient compression of the elastomer giving a high spring rate on longitudinal displacement. The metal interleaves 643 have correspondingly angled or bent forms to complement this shape.

According to well-known principles the bushing 6 is installed in a pre-compressed condition of the elastomer infill 64 by providing the outer shell 63 as a pair of shell parts 631 bonded on the respective elastomer elements 641. When installed the shell parts 631 form the cylindrical shell 63 with a joint line 632 where their edges meet.

Figures 7, 8:
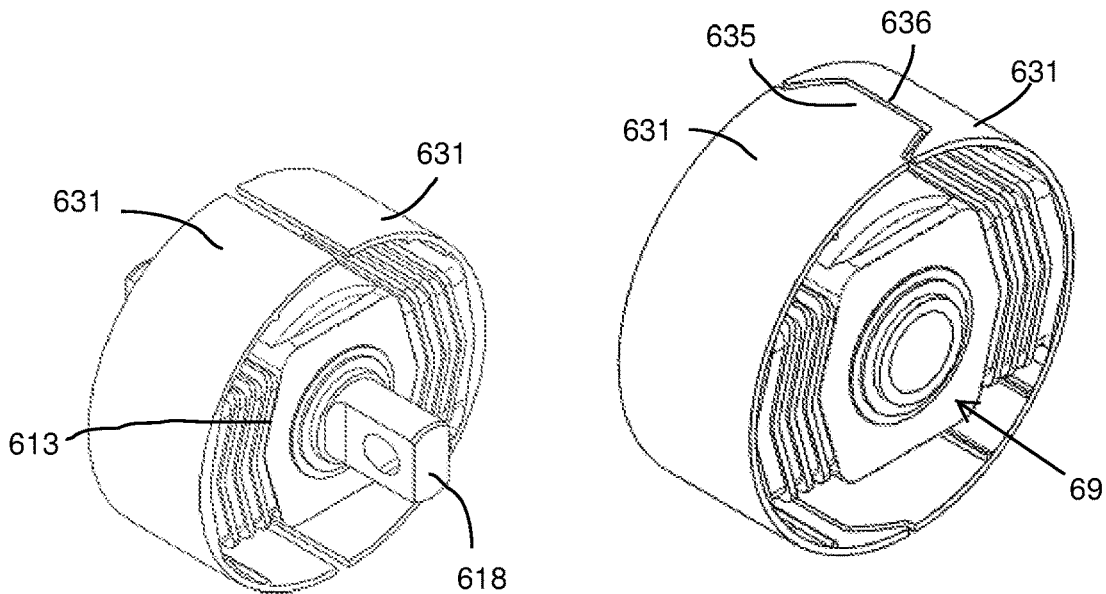
FIG. 7 is a perspective view of a second embodiment of a bush, with a different inner mount fixing.
FIG. 8 is a perspective view of a third embodiment of a bush, with a casing interlock feature.

A particular feature of the present embodiment is the provision of an internal bush 69 within the inner mount unit 61 itself. Specifically, the main metal block 611 of the inner unit has a central axial cylindrical through-hole 615 occupied by a rigid metal centre mount piece 617 with a cylindrical body and by an inner elastomer infill 616 which surrounds and supporting the centre mount piece 617 in the central hole for degree of resilient radial and relative rotational movement between the centre mount piece 617 and the block 611. In this embodiment the centre mount piece is a tube 617 e.g. for bolt-through mounting. FIG. 7 shows an alternative where the centre mount piece is a bar pin 618 with projecting ends for straddle mounting. The inner elastomer infill 616 is bonded to the adjacent metal components to provide resilient torsional resistance. It is a simple cylindrical sleeve, giving uniform small radial compliance in all directions. It enables the torsional response of the bushing to the—generally small—angular movements of the beam 4 to be uncoupled to some extent from its resilient response to vertical movements of the inner unit 61 relative to the outer sleeve 63 with flexion of the main elastomer elements 641.

FIG. 8 shows a refinement in which the ends of the shell parts 631 have interlocking formations—in this case a single projection 635 on one complementing a single recess 636 on the other—so as to inhibit relative axial movement which might lead to the bush "walking" out of its mounting tube 44. It will be understood that a variety of different casing formations can be used to achieve this advantage.

Figures 9A, 9B, 9C:
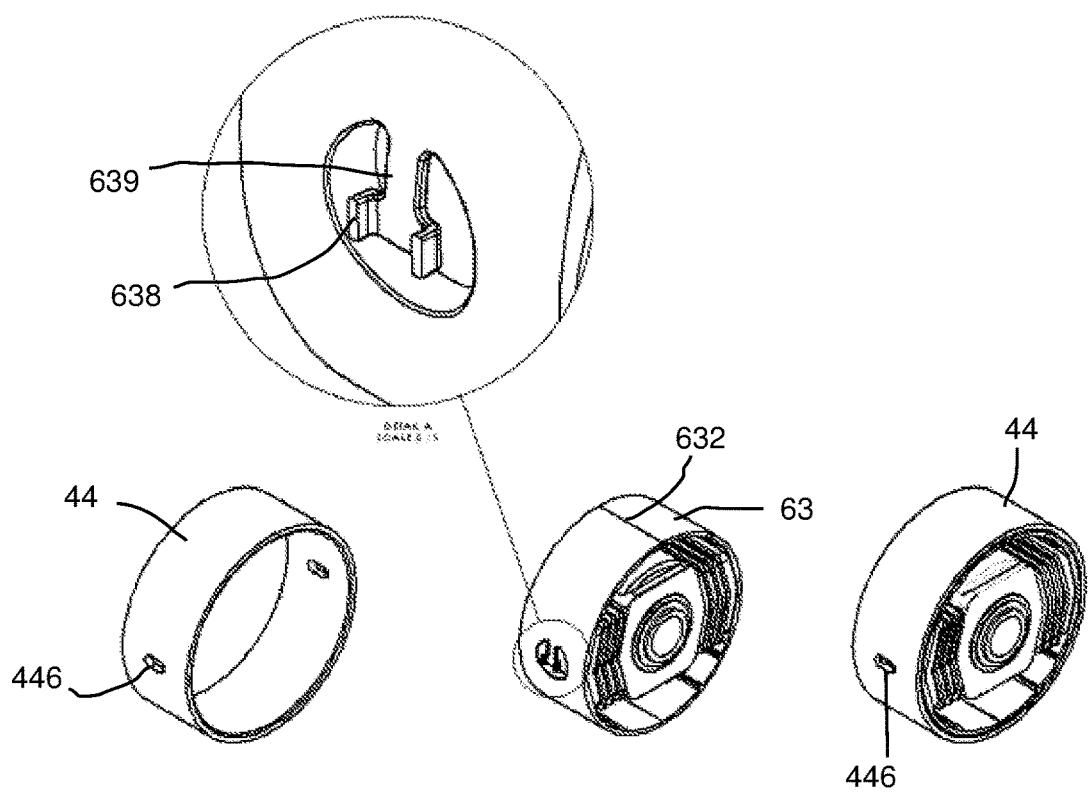
FIGS. 9(a) and (b) are perspective views of a bush mounting tube and of a fourth embodiment of a bush with an anti-rotation feature, FIG. 9(c) showing them assembled.

FIG. 9 shows an optional refinement for aligning the bush 6 rotationally in its mounting and inhibiting its rotation, having in mind that the difference between its vertical and horizontal stiffness is both large and important, and the bush must be correctly oriented relative to the system and the ground. There are various ways of assuring this. In the illustrated embodiment the casing 63 of the bush is formed with a radially-displaceable spring tang 639 having outward projections 638. These can engage selectively in a corresponding slot 446 in the wall of the mounting tube 44 when the bush is assembled and mounted.

In the exemplified bushing for example the longitudinal rate may be from 40,000 to 50,000 N/mm and the vertical rate from 700 to 1400 N/mm. The ratio of longitudinal to vertical stiffness (spring rate) may be e.g. about 35:1 and this is found to give good compliance and driving performance with a mid-lift axle. Other ratios and rates may be used depending on the kind of vehicle, expected axle load and the like.

FIG. 11 shows the axle/suspension system in operation with the wheels 57 moving over uneven terrain X, and a resulting tilt in the axle 5 being accommodated by substantial vertical displacement of the pivot connection bushing 6 on the left-hand side of the figure, so that the otherwise rigid axle-beam set does not upset the vehicle frame above.

The skilled person will understand that the embodiments shown are by way of example and that a wide range of alternative embodiments is available, the scope of the invention extending in line with the general principles as understood by the skilled person from this disclosure, and taking into account also the scope of the appended claims.

The invention claimed is:

1. Axle/suspension system; for a heavy-duty steerable truck or a tractor unit of a semi-trailer, having a vehicle frame with a longitudinal axis corresponding to a driving direction of said steerable truck or tractor unit, the system comprising
  - a rigid hollow vehicle axle of said steerable truck or tractor unit extending transversely and having first and second ends, and
  - a suspension assembly at each end of the axle to support the axle, each suspension assembly comprising
  - a frame mount for fixed attachment to the vehicle frame of said steerable truck or tractor unit, and
  - a rigid longitudinal suspension beam connected fixedly to the axle at an axle/beam connection structure and connected pivotably to the frame mount through a resilient compliant bush, thereby connecting the axle to the frame mount;
  - wherein said bush comprises an inner mount unit comprised in or connected to one of the beam and the frame mount, an outer mount comprised in or connected to the other of the beam and the frame mount, and an elastic spring infill portion comprising front and rear elastomer elements extending solidly between the inner mount unit and the outer mount and providing for resilient compliance on relative displacement thereof, each of the elastomer elements comprising rigid interleaves dividing the elastomer element into a series of sub-elements, and upper and lower voids being defined between the inner mount unit and the outer mount, and wherein
  - said bush has a longitudinal spring rate and a vertical spring rate, and a compliance ratio, being the ratio of the longitudinal spring rate to the vertical spring rate, is at least 15:1;
  - said bush provides for a vertical compliance of at least 15 mm in both directions of relative vertical displacement from a static neutral vertical position thereof, and the inner mount unit and outer mount can move through at least 50% of their maximum vertical relative movement without abutting contact across the upper or lower void.

2. Axle/suspension system of claim 1 in which said compliance ratio is at least 25:1.

3. Axle/suspension system of claim 1 in which the rigid beam is of a fabricated construction, a body of the beam being formed or assembled from one or more sheet-form or plate-form metal elements.

4. Axle/suspension system of claim 1 in which said bush provides for said vertical compliance of at least 20 mm in both directions of relative vertical displacement from the static neutral vertical position.

5. Axle/suspension system of claim 1 in which the bush provides for a longitudinal compliance of not more than 10 mm in both directions of relative longitudinal displacement from a neutral longitudinal position.

6. Axle/suspension system of claim 5 in which said longitudinal compliance is not more than 5 mm.

7. Axle/suspension system of claim 1 comprising an air spring mount on an upper side of the beam, on the axle or on the axle/beam connection structure.

8. Axle/suspension system of claim 1 which is a lift axle system, and comprises a lift mechanism for lifting the axle with upward pivoting of the beams relative to the frame mounts.

9. Axle/suspension system of claim 1 in which the inner mount unit of the bush is fixed to the frame mount and the outer mount is fixed to the beam.

10. Axle/suspension system of claim 1 comprising top and bottom deformable protection bumper portions facing onto the upper and lower voids to prevent direct rigid contact between the inner mount unit and the outer mount.

11. Axle/suspension system of claim 1 in which the inner mount unit and outer mount can move through at least 70% of their maximum vertical relative movement without abutting contact across the upper or lower void.

12. Axle/suspension system of claim 1 in which the inner mount unit defines an inner cavity containing an elastomer element and a rigid central mounting part.

13. Axle/suspension system of claim 1 in which the outer mount is connected to the beam, and engages the beam through a mechanical form engagement preventing rotation of the outer mount relative to the beam.

14. Axle/suspension system of claim 13 in which the outer mount comprises a casing having at least one circumferentially-localised outward projection engaging outwardly in a corresponding recess of a connecting structure of the beam to prevent rotation.

15. Axle/suspension system of claim 1 in which the bush comprises an outer casing with discrete parts which meet around the bush, the casing parts having interlock formations which overlap or interlock circumferentially to inhibit them from moving axially relative to one another.

16. Heavy-duty steerable truck or tractor unit of a semi-trailer, having a vehicle frame and comprising an axle/suspension system as defined in claim 1 with the frame mounts thereof fixed to respective frame members of the vehicle frame.

17. Heavy-duty steerable truck or tractor unit of claim 16 in which the frame mounts are hangers depending from the frame.

18. Heavy-duty steerable truck or tractor unit of claim 16 in which said axle is a mid-lift or tag axle.

19. Heavy-duty steerable truck or tractor unit of claim 16 comprising respective air springs connecting between said beams and/or axle and the vehicle frame above.

20. Axle/suspension system, for a heavy-duty vehicle having a vehicle frame with a longitudinal axis corresponding to a driving direction of the vehicle, the axle/suspension system comprising
- a vehicle axle extending transversely and having first and second ends, and
- a suspension assembly at each end of the axle to support the axle, each suspension assembly comprising
- a frame mount for fixed attachment to the vehicle frame, and
- a rigid longitudinal suspension beam connected fixedly to the axle at an axle/beam connection structure and connected pivotably to the frame mount through a resilient compliant bush, thereby connecting the axle to the frame mount;
- wherein said bush has a longitudinal spring rate and a vertical spring rate and a compliance ratio, being the ratio of the longitudinal spring rate to the vertical spring rate, of at least 10:1;
- said bush comprises
- an inner mount unit comprised in or connected to one of the beam and the frame mount,
- an outer mount comprised in or connected to the other of the beam and the frame mount, and
- an elastic spring infill portion comprising one or more elastomer elements extending between the inner mount unit and outer mount and providing for resilient compliance on relative displacement thereof, and
- the inner mount unit defines an inner cavity containing an elastomer element and a rigid central mounting part.

21. Axle/suspension system, for a heavy-duty vehicle having a vehicle frame with a longitudinal axis corresponding to a driving direction of the vehicle, the system comprising
- a vehicle axle extending transversely and having first and second ends, and
- a suspension assembly at each end of the axle to support the axle,
- each suspension assembly comprising
- a frame mount for fixed attachment to the vehicle frame, and
- a rigid longitudinal suspension beam connected fixedly to the axle at an axle/beam connection structure and connected pivotably to the frame mount through a resilient compliant bush, thereby connecting the axle to the frame mount;
- wherein said bush has a longitudinal spring rate and a vertical spring rate and a compliance ratio, being the ratio of the longitudinal spring rate to the vertical spring rate, of at least 10:1, and
- wherein the bush comprises an outer casing with discrete parts which meet around the bush, the casing parts having interlock formations which overlap or interlock circumferentially to inhibit them from moving axially relative to one another.

22. Axle/suspension system of a heavy-duty vehicle which is a steerable truck, or a tractor unit of a semi-trailer, said vehicle having a mid-lift or tag axle and a vehicle frame with a longitudinal axis corresponding to a driving direction of the vehicle, the axle/suspension system comprising
- a rigid vehicle axle of said steerable truck or tractor unit extending transversely and having first and second ends, said axle being said mid-lift or tag axle of said truck or tractor unit, and
- a suspension assembly at each end of the axle to support the axle, each suspension assembly comprising
- a frame mount for fixed attachment to the vehicle frame of the truck or tractor unit, and
- a rigid longitudinal suspension beam connected fixedly to the axle at an axle/beam connection structure and connected pivotably to the frame mount through a resilient compliant bush, thereby connecting the axle to the frame mount;
- wherein said bush has a longitudinal spring rate and a vertical spring rate and a compliance ratio, being the ratio of the longitudinal spring rate to the vertical spring rate, is at least 10:1.

* * * * *

UNITED STATES PATENT AND TRADEMARK OFFICE
CERTIFICATE OF CORRECTION

PATENT NO. : 10,807,430 B2
APPLICATION NO. : 15/778130
DATED : October 20, 2020
INVENTOR(S) : Sathya Babu, Nathan Wilson and Gerhard Seck Page 1 of 1

It is certified that error appears in the above-identified patent and that said Letters Patent is hereby corrected as shown below:

In the Claims

Claim 1, Column 11, Line 31, after the term "system" delete ";".

Signed and Sealed this
Fifteenth Day of December, 2020

Andrei Iancu
*Director of the United States Patent and Trademark Office*